United States Patent
Gates, Jr. et al.

(10) Patent No.: US 7,592,077 B2
(45) Date of Patent: Sep. 22, 2009

(54) COATED CUTTING TOOL WITH BRAZED-IN SUPERHARD BLANK

(75) Inventors: Alfred S. Gates, Jr., Greensburg, PA (US); Edward J. Oles, Ligonier, PA (US); Kent L. Reiner, Latrobe, PA (US); William M. Alexander, IV, North Huntingdon, PA (US); Jean-Pierre Genain, Beychac et Cailleau (FR)

(73) Assignee: Kennametal Inc., Latrobe, PA (US)

(*) Notice: Subject to any disclaimer, the term of this patent is extended or adjusted under 35 U.S.C. 154(b) by 873 days.

(21) Appl. No.: 10/463,379

(22) Filed: Jun. 17, 2003

(65) Prior Publication Data
US 2004/0256442 A1 Dec. 23, 2004

(51) Int. Cl.
*B32B 18/00* (2006.01)
*B32B 7/04* (2006.01)
*B32B 15/04* (2006.01)

(52) U.S. Cl. .................. 428/698; 428/577; 428/689; 428/697

(58) Field of Classification Search .................. 428/583, 428/698, 699; 228/121; 427/255.28, 249.1
See application file for complete search history.

(56) References Cited

U.S. PATENT DOCUMENTS

| | | |
|---|---|---|
| 3,743,489 A | 7/1973 | Wentorf, Jr. et al. ........... 51/307 |
| 3,745,623 A | 7/1973 | Wentorf, Jr. et al. ......... 29/95 B |
| 4,063,909 A | 12/1977 | Mitchell .................. 51/309 R |
| 4,186,628 A | 2/1980 | Bonnice |
| 4,225,322 A | 9/1980 | Knemeyer .................. 51/295 |
| 4,319,707 A | 3/1982 | Knemeyer .................. 228/46 |
| 4,527,998 A | 7/1985 | Knemeyer .................. 51/309 |
| 4,536,442 A | 8/1985 | Bovenkerk et al. .......... 428/323 |
| 4,601,423 A * | 7/1986 | Pipkin et al. ................ 228/121 |
| 4,647,546 A | 3/1987 | Hall, Jr. et al. ................ 501/96 |
| 4,650,776 A | 3/1987 | Cerceau et al. ............... 501/96 |
| 4,702,649 A | 10/1987 | Komanduri .................. 407/119 |
| 4,714,385 A | 12/1987 | Komanduri .................. 407/119 |
| 4,772,294 A | 9/1988 | Schroeder ..................... 51/309 |
| 4,787,466 A | 11/1988 | Tomlinson et al. .......... 175/329 |
| 4,850,523 A | 7/1989 | Slutz .......................... 228/121 |
| 4,859,531 A | 8/1989 | Tsuji et al. .................. 428/333 |
| 4,931,363 A | 6/1990 | Slutz et al. .................. 428/408 |
| 4,936,717 A | 6/1990 | Bosek .......................... 407/31 |
| 4,944,772 A | 7/1990 | Cho ............................. 51/293 |
| 4,954,139 A | 9/1990 | Cerutti ........................ 51/293 |
| 4,985,050 A | 1/1991 | Cerutti ........................ 51/293 |
| 5,037,704 A | 8/1991 | Nakai et al. |
| 5,038,645 A | 8/1991 | Walter et al. ................. 82/1.11 |
| 5,049,164 A | 9/1991 | Horton et al. ................. 51/295 |
| 5,079,102 A | 1/1992 | Tanaka et al. ............... 428/627 |

(Continued)

FOREIGN PATENT DOCUMENTS

EP 0299740 7/1988

(Continued)

OTHER PUBLICATIONS

Brochure on Brazing Alloys, SEMI-ALLOYS, Semalloy Brazing Alloys, Jul. 1968.*

(Continued)

*Primary Examiner*—Jennifer McNeil
*Assistant Examiner*—Jason L Savage
(74) *Attorney, Agent, or Firm*—Matthew W. Gordon

(57) ABSTRACT

A coated cutting tool that comprises a body containing a pocket. The tool further includes a polycrystalline cubic boron nitride blank that is brazed into the pocket using a braze alloy. The braze alloy has a liquidus temperature of at least about 900 degrees Centigrade. There is a coating applied to the cutting tool.

38 Claims, 6 Drawing Sheets

U.S. PATENT DOCUMENTS

| | | | | |
|---|---|---|---|---|
| 5,100,269 | A | 3/1992 | Lyon et al. | 407/107 |
| 5,129,918 | A | 7/1992 | Chattopadhay | 51/295 |
| 5,255,475 | A | 10/1993 | Kotthaus | 51/206 P |
| 5,273,557 | A * | 12/1993 | Cerutti et al. | 51/293 |
| 5,366,522 | A * | 11/1994 | Nakamura et al. | 51/293 |
| 5,389,118 | A | 2/1995 | Hinterman et al. | 51/295 |
| 5,429,459 | A | 7/1995 | Palm | 409/66 |
| 5,503,913 | A | 4/1996 | König et al. | 428/216 |
| 5,512,235 | A | 4/1996 | Cerutti et al. | 419/10 |
| 5,544,713 | A | 8/1996 | Dennis | 175/434 |
| 5,560,754 | A | 10/1996 | Johnson et al. | 51/297 |
| 5,564,511 | A | 10/1996 | Frushour | 175/431 |
| 5,630,479 | A | 5/1997 | Dennis | 175/426 |
| 5,639,285 | A | 6/1997 | Yao et al. | 51/307 |
| 5,691,260 | A | 11/1997 | Suzuki et al. | 501/96 |
| 5,697,994 | A | 12/1997 | Packer et al. | 51/309 |
| 5,709,907 | A | 1/1998 | Battaglia et al. | 427/126.1 |
| 5,722,803 | A | 3/1998 | Battaglia et al. | 407/119 |
| 5,773,140 | A | 6/1998 | Cerutti et al. | 428/332 |
| 5,830,813 | A | 11/1998 | Yao et al. | 501/87 |
| 5,848,348 | A | 12/1998 | Dennis | 419/5 |
| 5,868,885 | A | 2/1999 | Crockett et al. | 156/89.27 |
| 5,882,777 | A | 3/1999 | Kukino et al. | 428/216 |
| 5,887,580 | A | 3/1999 | Eyre | 126/36 |
| 5,985,228 | A | 11/1999 | Corrigan et al. | 423/290 |
| 6,041,875 | A | 3/2000 | Rai et al. | 175/432 |
| 6,063,333 | A | 5/2000 | Dennis | 419/6 |
| 6,068,913 | A | 5/2000 | Cho et al. | 428/212 |
| 6,090,476 | A | 7/2000 | Thysell et al. | 428/216 |
| 6,224,473 | B1 * | 5/2001 | Miller et al. | 451/461 |
| 6,358,428 | B1 | 3/2002 | Leverenz et al. | |
| 6,737,178 | B2 * | 5/2004 | Ota et al. | 428/698 |
| 2002/0014232 | A1 | 2/2002 | Garcia et al. | |

FOREIGN PATENT DOCUMENTS

| | | |
|---|---|---|
| EP | 0 474 092 A2 | 11/1992 |
| EP | 0706850 | 10/1995 |
| EP | 0852167 | 12/1997 |
| JP | 56059598 | 10/1979 |
| JP | 05140769 | 11/1991 |
| JP | 07266106 | 3/1994 |
| JP | 07060547 | 3/1995 |
| JP | 10193206 | 1/1997 |
| JP | 09267202 | 10/1997 |
| JP | 11320215 | 5/1998 |
| SU | 1144800 A | 3/1985 |
| WO | 9828464 | 7/1998 |
| WO | WO00/34001 | 6/2000 |
| WO | WO02/22311 A1 | 3/2002 |

OTHER PUBLICATIONS

Hobohm, "Polycrystalline Boron Nitride Cutting Edges", Historical Technical Reports, LACH Diamond Inc, Grand Rapids, MI, obtained from Internet Oct. 2000.

DICO Products Brochure, obtained from Internet Oct. 2000.

PCT Invitation to Pay Additional Fees for International Application No. PCT/US2004/017989 (2 pg).

PCT International Application No. PCT/US2004/017989 International Preliminary Report on Patentability mailed Jun. 22, 2005 (10 pages).

* cited by examiner

COATED CUTTING TOOL WITH BRAZED-IN SUPERHARD BLANK

BACKGROUND OF THE INVENTION

The present invention relates to a coated cutting tool that uses a superhard blank. More specifically, the present invention pertains to a coated cutting tool that uses, for example, a brazed-in polycrystalline cubic boron nitride blank.

Heretofore, there have been known coated cutting tools that use a superhard blank as the cutting element that provides a cutting edge. These cutting tools comprise a cutting tool body that contains a notch or pocket. The superhard blank is brazed into the notch or pocket using a braze alloy so that a braze joint is formed between the superhard blank and the cutting tool body.

In one alternative, the superhard blank comprises a support (e.g. cobalt cemented tungsten carbide) on which there is a layer of superhard material (e.g. polycrystalline cubic boron nitride). As another alternative, the blank is comprised of entirely superhard material. During the material removal process, the superhard layer (or superhard material) defines a cutting edge that comes into contact with the workpiece material to remove workpiece material so as to function as a cutting element.

During the material removal operation there is generated heat (and sometimes considerable heat) at the point of contact between the cutting edge of the superhard material and the workpiece material. This is especially the case when the workpiece material is hard such as, for example, a D3 tool steel. Such a material has a hardness on the order of Rockwell C 60 (AISI D3) wherein the quenched hardness can range between about 64 to about 66 Rockwell C and the tempered hardness can range between about 54 and about 61 Rockwell C.

Because of the generation of excessive heat, the use of coated cutting tools with a brazed-in superhard blank have experienced the drawback of debrazing of the superhard blank from the cutting tool body. In other words, the heat generated at the point of contact between the superhard blank and the workpiece material passes through the superhard blank so as to cause the temperature at the braze joint to reach such a level that the braze alloy melts (or softens) thereby reducing the shear strength of the braze joint. A reduction in the shear strength of the braze joint weakens the braze joint so that the cutting forces exerted on the superhard blank can detach the superhard blank from the cutting tool body.

Dry cutting processes such as removing material by machining from carbon:carbon composite materials, abrasive-reinforced polymeric materials, and various types of wood materials through the use of cutting tools using a brazed-in superhard blank can also generate higher cutting temperatures. As mentioned earlier, these higher cutting temperatures result in a higher temperature at the braze joint. These higher temperatures at the braze joint can result in a softening or melting of the braze alloy thereby reducing the shear strength so as to cause the superhard blank to become detached or separated from the cutting tool body under the influence of the cutting forces exerted on the superhard blank.

The degree of the cutting forces exerted on the cutting tools taken in light of the cutting temperature, the temperature at the braze joint, the liquidus temperature of the braze alloy, and the shear strength of the braze alloy appear to influence the ability of the superhard blank to be retained in the pocket of the cutting tool during the material removal operation. When the temperature at the braze joint reaches a certain level, there begins a reduction in the shear strength of the braze joint. When the shear strength of the braze joint is less than necessary to maintain its integrity against the cutting forces exerted on the superhard blank, the superhard blank becomes detached from the cutting tool body. As one can appreciate, the premature (or catastrophic) separation or detachment of the superhard blank from the cutting tool body is an undesirable result.

It would thus be desirable to provide a coated cutting tool that uses a brazed-in superhard blank as the cutting element that presents a cutting edge wherein the braze joint between the cutting tool body and the superhard blank is able to withstand the heat generated during the material removal operation.

It would also be desirable to provide a coated cutting tool that uses a brazed-in superhard blank as the cutting element that presents a cutting edge wherein the braze joint between the cutting tool body and the superhard blank is able to withstand the heat generated during the material removal operation through the use of braze alloys that maintain an adequate shear strength at the temperatures that exist at the braze joint during the material removal operation (i.e., high temperature braze alloys) so as to maintain the integrity of the braze joint.

It would further be desirable to provide a coated cutting tool that uses a brazed-in superhard blank as the cutting element that presents a cutting edge wherein the braze joint between the cutting tool body and the superhard blank is able to withstand the heat generated during the material removal operation through the use of high temperature braze alloys along with the geometry and design of the superhard blank so as to reduce the exposure of the braze joint to excessive temperatures so that the integrity of the brazed joint is maintained during the material removal operation.

It would be additionally desirable to provide a coated cutting tool that uses a brazed-in superhard blank as the cutting element that presents a cutting edge wherein the braze joint between the cutting tool body and the superhard blank is able to withstand the heat generated during the material removal operation through the geometry and design of the superhard blank so as to reduce the exposure of the braze joint to excessive temperatures so that the integrity of the braze joint is maintained during the material removal operation.

Finally, it would be desirable to provide a coated cutting tool that uses a brazed-in superhard blank as the cutting element that presents a cutting edge wherein the braze joint between the cutting tool body and the superhard blank is able to withstand the heat generated during the material removal operation through the use of high temperature braze alloys as well as coating schemes that help protect the braze joint from exposure to excessive temperatures.

SUMMARY OF THE INVENTION

In one form thereof, the invention is a coated cutting tool that comprises a body containing a pocket. The tool further includes a polycrystalline cubic boron nitride blank that is brazed into the pocket using a braze alloy. The braze alloy has a liquidus temperature of at least about 900 degrees Centigrade. There is a coating applied to the cutting tool.

In still another form thereof, the invention is a coated cutting tool that comprises a body that contains a pocket wherein a superhard blank is brazed into the pocket using a braze alloy. The braze alloy has a liquidus temperature of at least about 900 degrees Centigrade wherein the braze alloy is selected from the group comprising a nickel-gold braze alloy containing nickel and gold, a copper-gold braze alloy containing copper and gold, and a silver-palladium braze alloy containing silver and palladium. There is a coating applied to the cutting tool.

In still another form thereof, the invention is a coated cutting tool for removing material from a workpiece in a material removal operation wherein the coated tool engages the workpiece at a selected depth of cut. The cutting tool comprises a body that contains a pocket. A polycrystalline cubic boron nitride blank has a rake surface, a cutting edge, and a leg extending away from the cutting edge. The blank is brazed into the pocket using a braze alloy whereby there is a braze joint between the body and the polycrystalline cubic boron nitride blank. The braze joint is located a distance away from the rake surface of the polycrystalline cubic boron nitride blank ranging between about 1.5 millimeters and about 4.9 millimeters and the leg having a length that is at least about 1.7 times as great as the depth of cut. A coating is applied to the cutting tool.

In still another form thereof, the invention is a coated cutting tool for removing material from a workpiece in a material removal operation. The coated cutting tool comprises a body that contains a pocket. A superhard blank has a rake surface and a cutting edge wherein the blank is brazed into the pocket using a braze alloy whereby there is a braze joint between the body and the blank. The braze alloy has a liquidus temperature. The superhard blank engages the workpiece during the material removal operation so that cutting forces are exerted on the superhard blank and heat is generated at the cutting edge of the superhard blank. The braze joint is located a selected distance away from the cutting edge so that the temperature at the braze joint is less than the liquidus temperature of the braze alloy whereby the braze joint has sufficient shear strength to retain the superhard blank in the pocket during the material removal operation. There is a coating on the cutting tool.

In yet another form thereof, the invention is a process for making a coated cutting tool comprising the steps of: providing a body containing a pocket; brazing a polycrystalline cubic boron nitride blank into the pocket using a braze alloy wherein the braze alloy having a liquidus temperature of at least about 900 degrees Centigrade; etching the polycrystalline cubic boron nitride blank with titanium tetrachloride and aluminum chloride gases; and coating the cutting tool by chemical vapor deposition.

In yet another form thereof, the invention is a method of removing material in a threading operation from a workpiece comprising a ferrous alloy having a hardness between about 50 Rockwell C and about 65 Rockwell C using a coated cutting tool, the process comprising: providing a coated cutting tool having body containing a pocket where a superhard blank is brazed using a braze alloy into the pocket to form a braze joint wherein the braze alloy having a liquidus temperature of at least about 900 degrees Centigrade wherein the braze alloy is selected from the group comprising a nickel-gold braze alloy containing nickel and gold, a copper-gold braze alloy containing copper and gold, a gold-copper-nickel braze alloy contains gold and copper and nickel, a silver-titanium-copper braze alloy containing silver and titanium and copper, and a silver-palladium braze alloy containing silver and palladium; and engaging the workpiece with the coated cutting tool on multiple passes wherein each pass removes a volume of material substantially equal to or less than the volume of material removed from the workpiece in the previous pass.

BRIEF DESCRIPTION OF THE DRAWINGS

The following is a brief description of the drawings that form a part of this patent application.

DETAILED DESCRIPTION OF THE INVENTION

Figure 1:
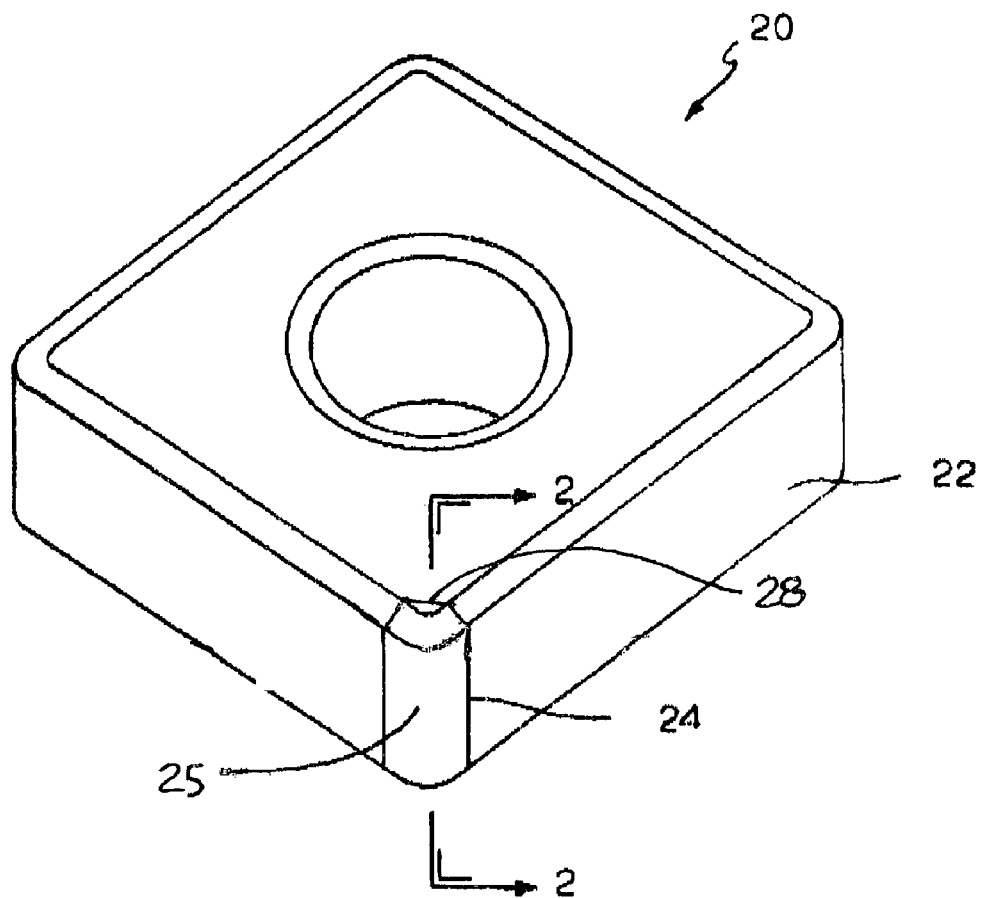
FIG. 1 is an isometric view of one embodiment of a coated cutting tool that comprises a body with a pocket (or a notch) and a polycrystalline cubic boron nitride blank brazed in the pocket wherein the blank is comprised entirely of polycrystalline cubic boron nitride.
Figure 2:
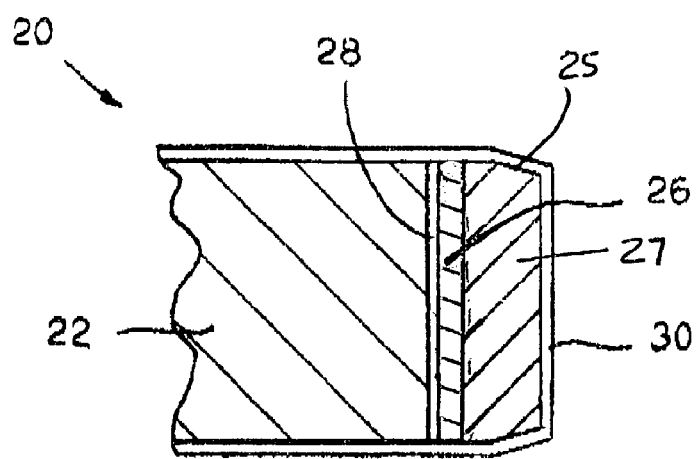
FIG. 2 is a cross-section view of the coated cutting tool of FIG. 1 taken along section line 2-2 of FIG. 1.

Referring to the drawings, FIGS. 1 and 2 illustrate one embodiment of the coated cutting tool generally designated as cutting tool 20. Cutting tool 20 has a body 22 that contains a notch or pocket 24. The body 22 can be made from a number of materials, but one preferred material is cobalt cemented tungsten carbide wherein the cobalt comprises about 6 weight percent of the cemented tungsten carbide and the tungsten carbide comprises about 94 weight percent of the cemented tungsten carbide. The notch 24 is located at one corner of the body 22, but it should be appreciated that the notch could be at opposite corners or at all four corners of the body 22.

A polycrystalline cubic boron nitride (PcBN) blank 25 is brazed to the body 22 within the notch 24. The PcBN blank 25 comprises a carbide support 26 on which there is a layer of polycrystalline cubic boron nitride 27. Although specific compositions of PcBN will be set forth hereinafter, the typical PcBN insert is a mixture of cubic boron nitride and another material such as, for example, titanium carbide, or some other suitable binder material. A braze joint 28 is at the juncture between the body 22 and the PcBN blank 25. Specific braze alloys will be described hereinafter. The preferred braze alloy for this application is a high temperature braze alloy in which the liquidus temperature (i.e., the lowest temperature at which the alloy is completely liquid) is at least about 900 degrees Centigrade, and even more preferably, the liquidus temperature is at least about 1000 degrees Centigrade. Braze alloys such as those listed in Table 1 are useful high temperature braze alloys. However, as will become more apparent from the discussion hereinafter, braze alloys with lower liquidus temperatures can be appropriate to use in light of the design and geometry of the polycrystalline cubic boron nitride blank that reduces the exposure of the braze joint to excessive temperatures during the material removal operation.

The cutting tool has a coating 30 applied thereto. The coating is also shown as a single layer. It is typical, however, that the coating may comprise more than one layer as will become apparent from the specific coating schemes described hereinafter.

Figure 3:
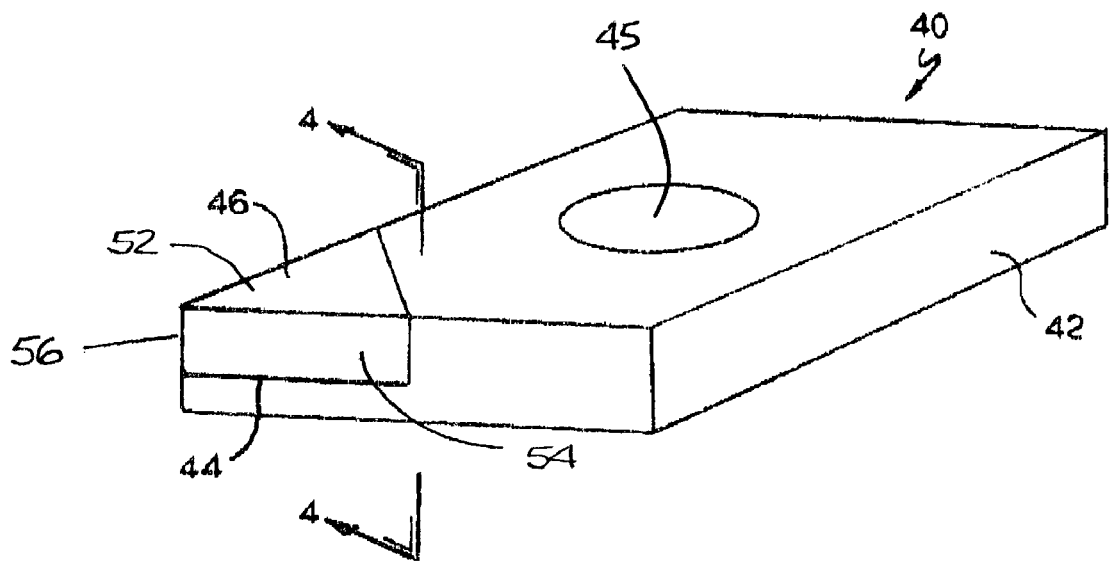
FIG. 3 is an isometric view of another embodiment of a coated cutting tool (i.e., a threading tool) that contains a pocket and a polycrystalline cubic boron nitride blank brazed in the pocket wherein the blank comprises a layer of polycrystalline cubic boron nitride attached to a layer of cobalt cemented tungsten carbide, and the coating is a multi-layer coating.
Figure 4:
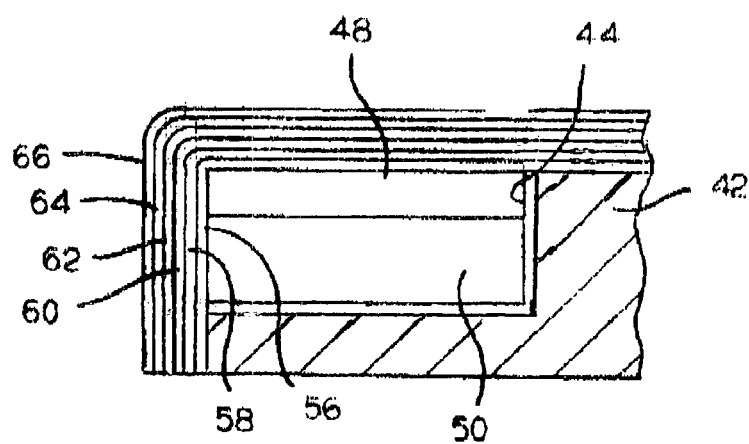
FIG. 4 is a cross-sectional view of the coated cutting tool of FIG. 3 taken along section line 4-4 of FIG. 3 showing, among other things, the multiple layers of the coating scheme and the braze joint.

Referring to FIGS. 3 and 4, there is shown another embodiment of a coated cutting tool generally designated as 40. Cutting tool 40 is one example of a threading tool. Cutting tool 40 includes a body 42 that contains a pocket 44 and an aperture 45. As discussed above with respect to the body 22 of cutting tool 20, the body 42 may be made from a number of materials including cobalt cemented tungsten carbide. A polycrystalline cubic boron nitride blank 46 is brazed within the pocket 44. The PcBN blank 46 comprises a PcBN layer 48 and a cobalt cemented tungsten carbide support 50. The PcBN layer 48 is affixed to the support 50. The PcBN blank 46 has a rake surface 52 and flank surfaces 54 wherein the rake surface 52 and the flank surfaces 54 intersect to form a cutting edge 56. Like for the cutting tool 20 of FIGS. 1 and 2, the composition of the PcBN layer may vary depending upon the specific application. One specific composition for the PcBN layer is KD050 wherein KD050 has a composition that comprises about 50 volume percent cubic boron nitride and about 50 volume percent titanium carbide. The support 50 may also comprise any one of a variety of compositions depending upon the application.

The PcBN blank 46 has a multi-layer coating applied thereto. In the specific embodiment shown in FIG. 3 the coating comprises six layers, and the coating scheme is applied in the following steps beginning with preparation of the substrate surface first and applying the coating layer to the substrate surface: (1) etching the substrate surface with titanium tetrachloride and aluminum chloride gases; (2) applying via CVD a coating of titanium nitride (coating layer 56) at a temperature of about 900 degrees Centigrade to a thickness that ranges between about 0.5 micrometers and about 3 micrometers with a preferred thickness that equals about 1 micrometers; (3) applying via CVD a coating of titanium carbonitride (coating layer 58) at a temperature of about 880 degrees Centigrade to a thickness that ranges between about 1 micrometers and about 10 micrometers with a preferred thickness that equals about 3 micrometers; (4) applying via CVD a coating of titanium carbonitride (coating layer 60) at a temperature of about 1000 degrees Centigrade to a thickness that ranges between about 0.5 micrometers and about 5 micrometers with a preferred thickness that equals about 1 micrometers; (5) applying via CVD a bonding layer of titanium oxycarbonitride and titanium aluminum oxycarbonitride [graded] (coating layer 62) at a temperature of about 1000 degrees Centigrade to a thickness that ranges between about 0.3 micrometers and about 5 micrometers with a preferred thickness that equals about 1 micrometer; (6) applying via CVD a coating of alumina (coating layer 64) at a temperature of about 1000 degrees Centigrade to a thickness that ranges between about 1 micrometer and about 10 micrometers with a preferred thickness that equals about 4 micrometers; and (7) applying via CVD a coating of titanium nitride-titanium carbonitride (coating layer 66) at a temperature of about 1000 degrees Centigrade to a thickness that ranges between about 0.5 micrometers and about 6 micrometers with a preferred thickness that equals about 2 micrometers.

Figure 5:
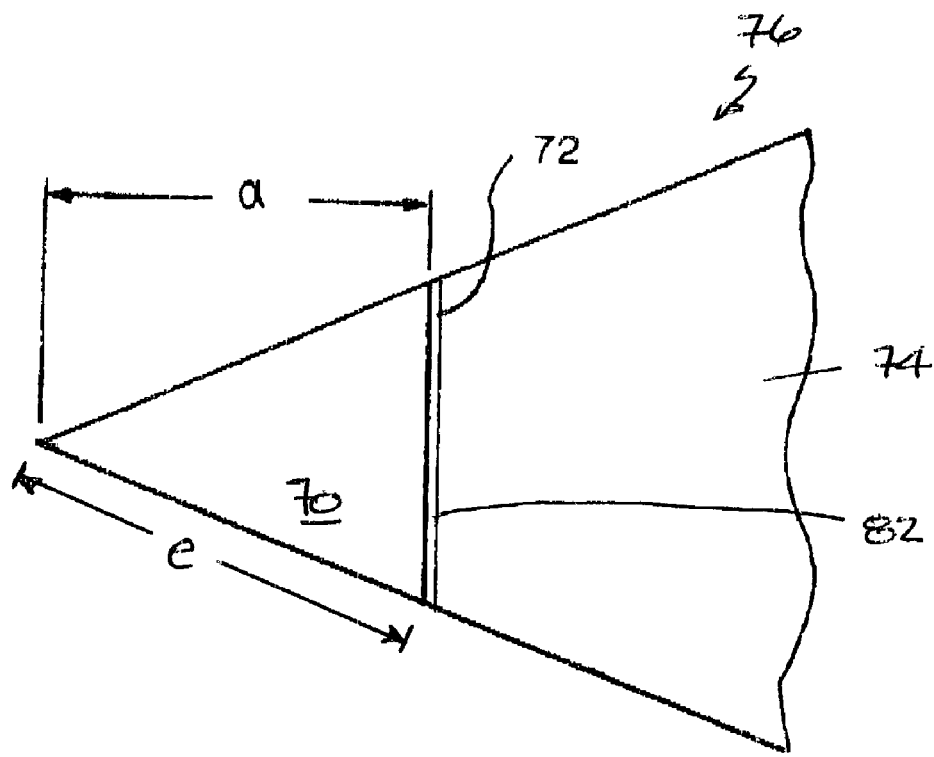
FIG. 5 is a top schematic view of a portion of a coated threading tool showing selected dimensions of the polycrystalline cubic boron nitride blank.
Figure 6:
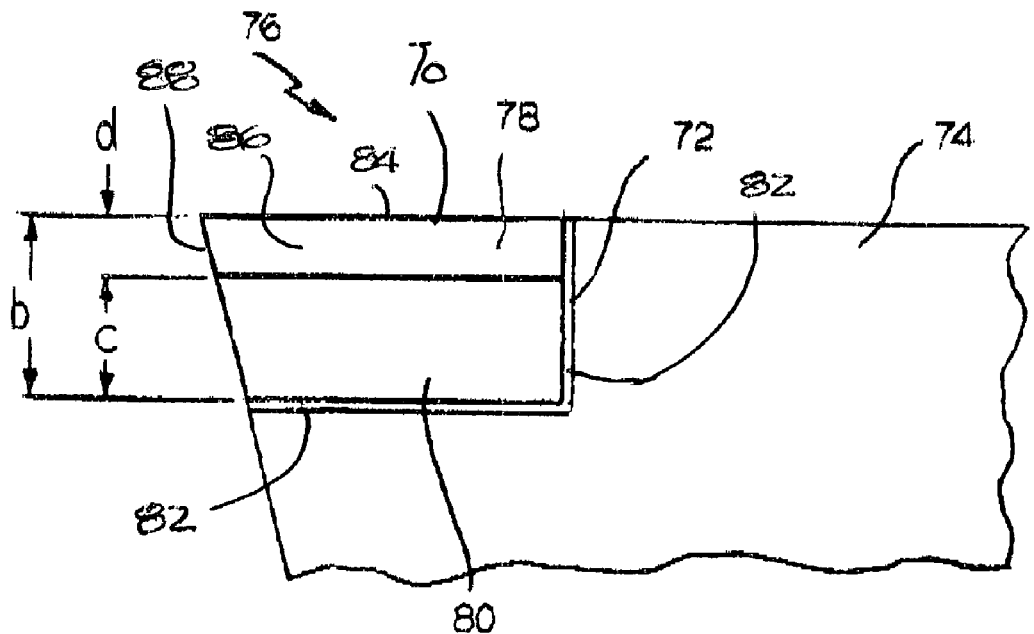
FIG. 6 is a side schematic of the coated cutting tool of FIG. 5 showing selected dimensions of the polycrystalline cubic boron nitride blank.

Referring to FIGS. 5 and 6, there is shown the arrangement of a PcBN blank 70 brazed into the pocket 72 of a body 74 for a threading tool generally designated as 76. The PcBN blank 70 comprises a layer of PcBN 78 and a cobalt cemented tungsten carbide support 80. There is a braze joint 82 between the PcBN blank 70 and surfaces of the cutting tool body that defines the pocket 72. The PcBN blank 70 has a rake surface 84 and a flank surface 86. The rake surface 84 and the flank surface 86 intersect to form a cutting edge 88. For illustrative purposes the coating is removed from FIGS. 5 and 6.

A way to optimize the ability of the braze joint to withstand the temperatures that exist at the braze joint during a cutting operation is to locate the braze joint an optimum distance away from the point of contact between the PcBN blank (i.e., the cutting edge) and the workpiece material. The dimensions of the PcBN blank determine the distance between the point of contact and the braze joint. In the case of a superhard blank that comprises a PcBN layer on a cobalt cemented tungsten carbide support, the selection of these dimensions is based on balancing the cost of increasing the size of the layer of PcBN or increasing the size of the support (or a combination of increasing the size of the layer of PcBN and the size of the support) against the extent of thermal protection for the braze joint due to the distance between the point of contact and the braze joint. In the case of a superhard blank that is one piece of PcBN, the size (and hence the cost) of the PcBN piece is balanced against the extent of thermal protection of the braze joint due to the distance between the point of contact and the braze joint.

Figure 5A:
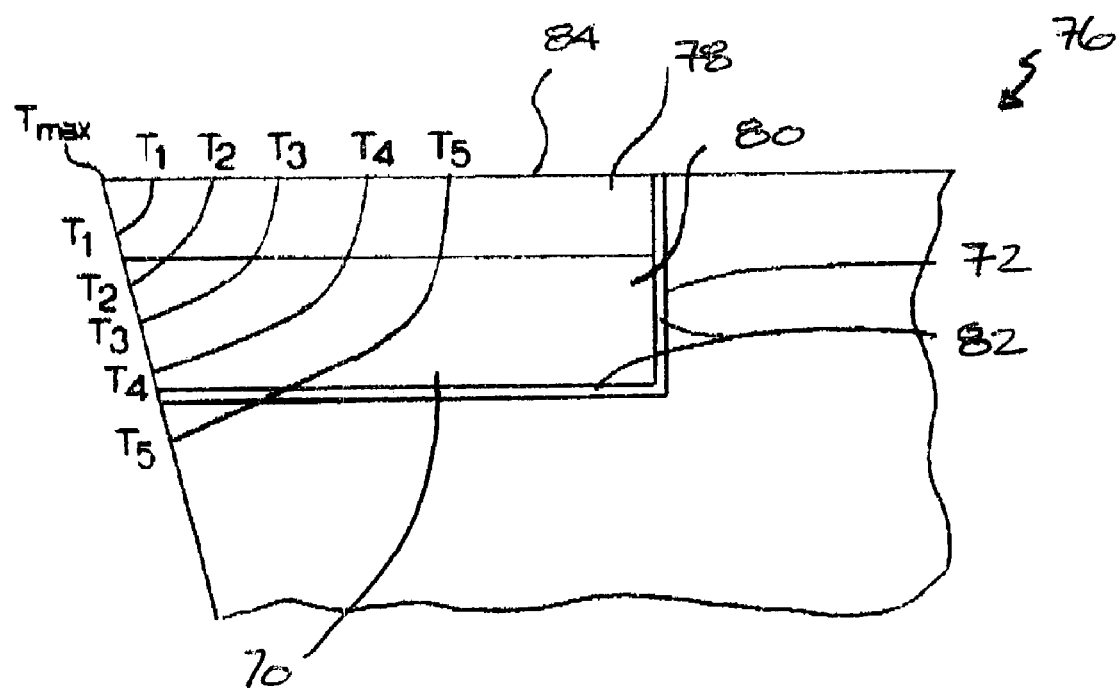
FIG. 5A is a side schematic view of the coated threading tool of FIG. 4 that shows thermal gradients therein as would occur during a material removal operation.

FIG. 5A is a schematic view that shows thermal gradient lines $T_{max}$ and $T_1$ through $T_5$ for the coated cutting tool 76 as would occur during a material removal operation. The maximum temperature is ($T_{max}$) is at the point of contact between the cutting edge of the PcBN blank 70 and the workpiece material. The temperature gradient lines $T_1$, $T_2$, $T_3$, $T_4$, and $T_5$ represent five different temperatures at various distances away from the point of contact. As one can appreciate, the temperature decreases as one moves farther away from the point of contact. The temperature gradient has the following relationship:

$$T_1 > T_2 > T_3 > T_4 > T_5.$$

The braze joint 82 comprises the joint between the PcBN blank 70 and the pocket 72 contained in the cutting tool body 74 wherein the braze joint 82 has two principal portions. One portion is between the PcBN blank and the seating (or horizontal in FIG. 5A) surface of the pocket and the other portion is between the PcBN blank and the backing (or vertical on FIG. 5A) surface. These temperature gradient lines show that the braze joint 82 is exposed to the higher temperatures at a location near the point of contact and that the temperature decreases as one moves farther away from the point of contact. By selecting certain dimensions of the PcBN blank that impact upon the location of the braze joint relative to the cutting edge, one can select the temperature that exists at the braze joint or at least provide some degree of thermal protection for the braze joint. In the case of a superhard blank that comprises a support and a PcBN layer, the thickness of the support is typically increased since it is the least expensive component of these two components of the superhard blank. The extent to which the thickness of the support is increased depends upon the cutting temperatures and the properties (e.g., the liquidus temperature and the shear strength) of the particular braze alloy. The thickness of the support should be sufficient so that the temperature that exists at the braze joint, which in FIG. 5A would be about $T_5$, would be less than the liquidus temperature of the braze alloy and so that the braze alloy would possess sufficient shear strength so as to maintain the integrity of the braze joint so as to thereby retain the PcBN blank to the cutting tool body against the cutting forces that would be exerted on the PcBN blank.

In one embodiment as illustrated in FIGS. 5 and 6, the length "a" of the PcBN blank 70 is 0.190 inches (4.82 millimeters); the thickness "d" of the PcBN layer 78 is 0.030 inches (0.76 millimeters); the thickness "c" of the support 80 is 0.160 inches (4.1 millimeters); and the overall thickness "b" of the PcBN blank 70 is 0.190 inches (4.83 millimeters). The leg length of the PcBN blank is dimension "e", and it equals about 0.220 inches (5.59 millimeters).

Figure 7:
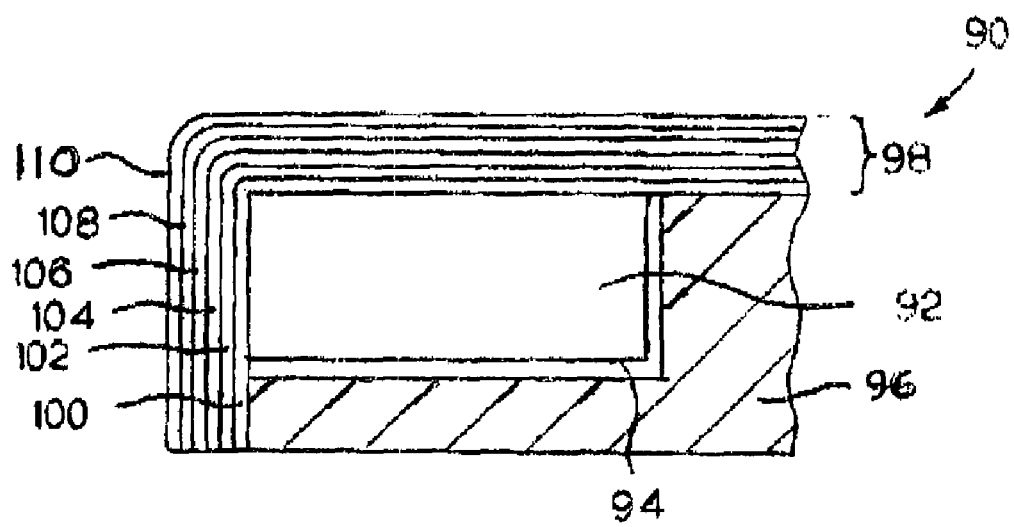
FIG. 7 is a cross-sectional view of a coated cutting tool wherein the cutting tool body contains a pocket and a polycrystalline cubic boron nitride blank is brazed in the pocket wherein the blank is comprised entirely of polycrystalline cubic boron nitride, and the coating is a multi-layer coating.

Referring to FIG. 7, there is shown a cross-sectional view of a coated cutting tool generally designated as 90 wherein the cutting tool 90 has a PcBN blank 92 brazed into the pocket 94 of the tool body 96. The PcBN blank 92 is comprised entirely of polycrystalline cubic boron nitride. One exemplary PcBN blank 92 that is comprised entirely of polycrystalline cubic boron nitride is a PcBN material sold under the designation AMBORITE (Grade AMB 90) by Element Six wherein the AMBORITE (Grade AMB 90) PcBN material comprises about 90 volume percent cubic boron nitride and about 10 volume percent comprising the sum of aluminum nitride, titanium diboride and silicon carbide. A coating scheme for the AMBORITE (Grade AMB 90) PcBN material comprises: a chemical vapor deposition coating scheme applied at a temperature between about 970 degrees Centigrade and about 1000 degrees Centigrade having an initial layer of alumina, then a layer of titanium carbonitride, followed by a layer of titanium oxycarbonitride, followed by a layer of titanium aluminum oxycarbonitride, followed by a thick layer of alumina, then a layer of titanium nitride, then a layer of titanium carbonitride, and a final layer of titanium nitride. The thickness of the thick alumina layer was between about 5 and about 6 micrometers. The thickness of the layers beneath the thicker alumina layer was about 3 micrometers, and the thickness of the layers on top of the thicker alumina layer was about 2.5 micrometers.

Another coating scheme (shown by brackets 98) that is suitable for use with the cutting tool 90 is described as follows: the coating scheme is applied in the following steps: (1) etching the substrate surface with titanium tetrachloride and aluminum chloride gases; (2) applying via CVD a coating of aluminum oxide (coating layer 100) at a temperature of about 1000 degrees Centigrade to a thickness that ranges between about 0.5 micrometers and about 10 micrometers with a preferred thickness that equals about 1 micrometer; (3) applying via CVD a coating of titanium nitride (coating layer 102) at a temperature of about 1000 degrees Centigrade to a thickness that ranges between about 0.5 micrometers and about 6 micrometers with a preferred thickness that equals about 1 micrometers; (4) applying via CVD a coating of titanium carbonitride (coating layer 104) at a temperature of about 990 degrees Centigrade to a thickness that ranges between about 0.5 micrometers and about 8 micrometers with a preferred thickness that equals about 2 micrometers; (5) applying via CVD a bonding layer of titanium oxycarbonitride and titanium aluminum oxycarbonitride (graded) (coating layer 106) at a temperature of about 1000 degrees Centigrade to a thickness that ranges between about 0.5 micrometers and about 6 micrometers with a preferred thickness that equals about 1 micrometers; (6) applying via CVD a coating of alumina (coating layer 108) at a temperature of about 1000 degrees Centigrade to a thickness that ranges between about 0.5 micrometers and about 12 micrometers with a preferred thickness that equals about 4 micrometers; and (7) applying via CVD a coating of titanium nitride-titanium carbonitride-titanium nitride (coating layer 110) at a temperature of about 1000 degrees Centigrade to a thickness that ranges between about 0.5 micrometers and about 6 micrometers with a preferred thickness that equals about 2 micrometers.

Figure 8:
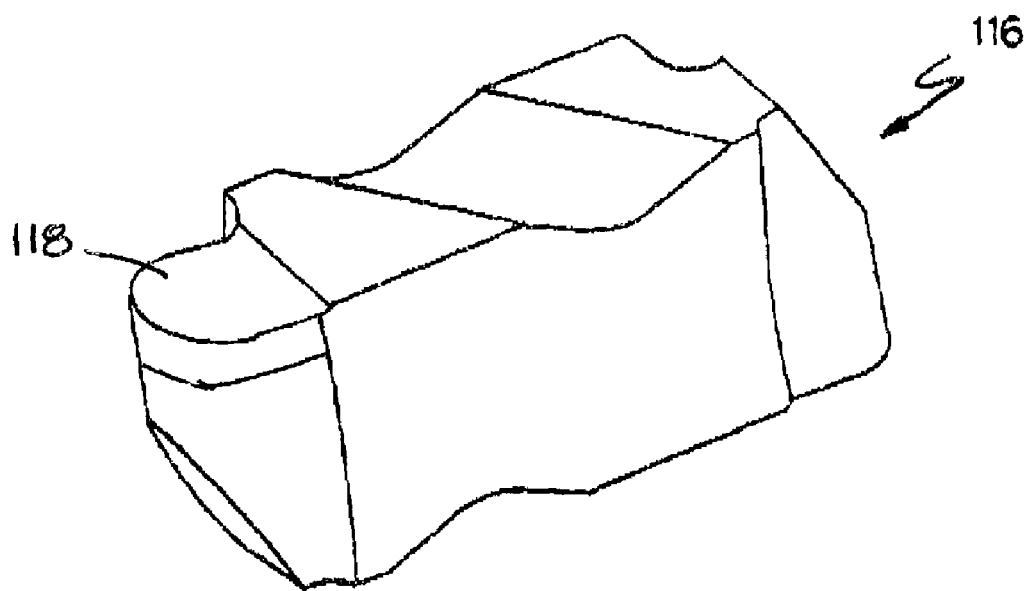
FIG. 8 is an isometric view of a coated grooving tool wherein the geometry of the tool is of a TOP NOTCH® (TOP NOTCH® is a registered trademark of Kennametal Inc.) design.

FIG. 8 shows a coated cutting tool generally designated as 116. Cutting tool 116 has a superhard blank 118. Cutting tool 116 is a grooving tool that is designated as a TOP NOTCH® tool.

Figure 9:
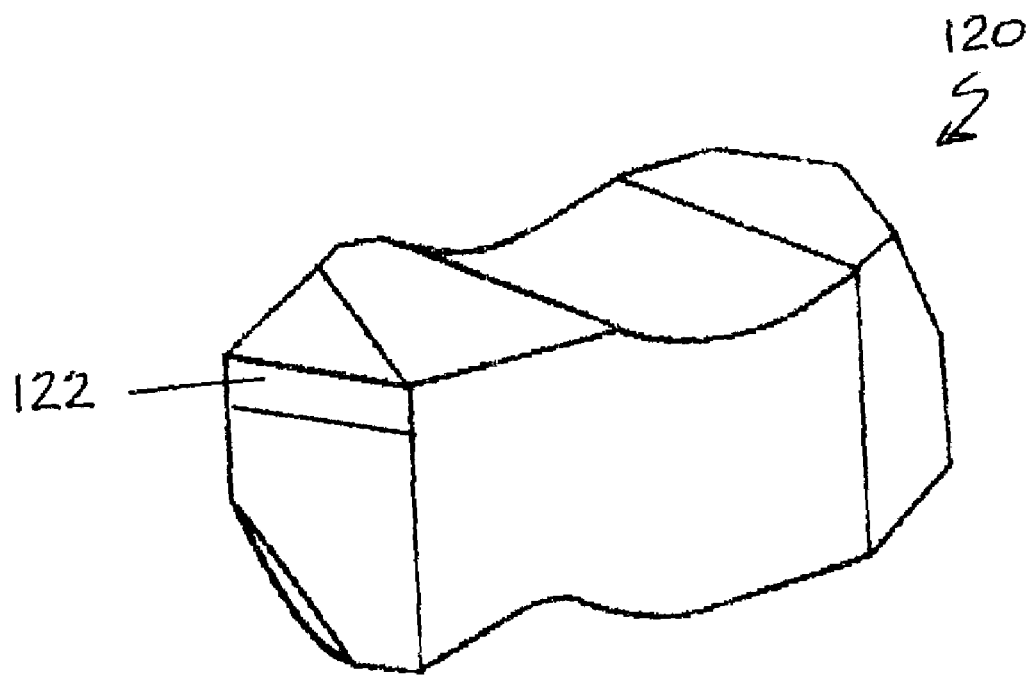
FIG. 9 is an isometric view of a coated threading tool wherein the geometry of the tool is of a TOP NOTCH® (TOP NOTCH® is a registered trademark of Kennametal Inc.) design.

FIG. 9 shows a coated cutting tool generally designated as 120. Cutting tool 120 has a superhard blank 122. Cutting tool 120 is a threading tool that is designated as a TOP NOTCH® tool.

Set forth below in Table 1 are typical braze alloys useful for the brazing of the polycrystalline cubic boron nitride blanks to the body of the cutting tool.

TABLE 1

Examples of Useful Braze Alloys

| Braze Alloy | Composition (weight percent) | Liquidus (Degrees Centigrade) | Solidus (Degrees Centigrade) | Melting Point (Degrees Centigrade) | Shear Strength (pounds) |
|---|---|---|---|---|---|
| Gold-Copper | 50% Au 50% Cu | 969 | 954 | 954 | 13,752 |
| Gold-Copper-Nickel | 35% Au 62% Cu 3% Ni | 1028 | 973 | 973 | 12,844 |
| Gold-Copper | 37.5% Au 62.5% Cu | 1015 | 940 | 940 | 13,023 |
| Bau-4 Gold-Nickel | 82% Au 18% Ni | 948 | 948 | 948 | 21,686 |
| Bau-6 Gold-Nickel-Palladium | 70% Au 22% Ni 8% Pd | 1045 | 1006 | 1006 | 26,670 |
| Silver-Palladium | 95% Ag 5% Pd | 995 | 970 | 970 | Not Measured |

In the Table 1 above, the shear strength is reported in pounds and is the result of a test in which a one-half inch square carbide is brazed to a carbide member and the braze joint between these carbide members (i.e., a carbide-to-carbide braze joint) is placed in pure shear. The braze joint is continually loaded until failure and the result is given in the pounds at which the braze joint failed.

As is apparent from the discussion below, Table 2 provides information that is necessary to fully understand the coating schemes that are set forth below in Tables 3 through 7. Tables 3 through 7 contain examples of coating schemes that are applicable to the polycrystalline cubic boron nitride cutting tools of the invention. In these examples, the cutting tools used the KD050 composition of polycrystalline cubic boron nitride. KD050 composition comprised about 50 volume percent cubic boron nitride and about 50 volume percent titanium carbide. Tables 3 through 7 each set forth the details regarding one series of the coating schemes.

Referring to Tables 3 through 7, the left hand column identifies the tool number and lists the composition of the polycrystalline cubic boron nitride layer. The composition of the PcBN is either KD050 or KD120 as set forth above.

Still referring to Tables 3 and 7, the column entitled "coating scheme" presents the various coating schemes (or arrangements) that were applied to the PcBN blank starting with the coating next to the substrate. The abbreviations have the meanings set out in Table 2 below.

TABLE 2

Meanings of Abbreviations For Coating Schemes Listed in Tables 3 and 4

| Abbreviation | Meaning |
| --- | --- |
| N | High temperature (970–1000° C.) CVD application of titanium nitride |
| CN | High temperature (970-1000° C.) CVD application of titanium carbonitride |
| MT | Moderate temperature (870-890° C.) CVD application of titanium carbonitride |
| A | CVD application of alumina at a temperature equal to 970-1000° C. |
| OCN | CVD application of a layer of TiOCN which is the alpha-alumina modification layer at a temperature equal to 970-1000° C. |
| TiAlOCN | CVD application of a layer of TiAlOCN at a temperature equal to 970-1000° C. |

TABLE 2-continued

Meanings of Abbreviations For Coating Schemes Listed in Tables 3 and 4

| Abbreviation | Meaning |
| --- | --- |
| MT-N | Moderate temperature (870-890° C.) CVD application of titanium nitride |

In regard to the column entitled "Thickness", this column sets forth three thickness measurements in micrometers. The first thickness measurement represents the total thickness of the layers of from the substrate to the alumina layer. The second thickness measurement represents the thickness of the alumina layer. The third thickness measurement represents the thickness of the layers on top of the alumina layer.

In regard to the column identified as "Braze Alloy", this is the braze alloy that was used to braze the PcBN blank into the pocket of the body. These braze alloys correspond to those braze alloys listed in Table 1 hereinabove.

TABLE 3

Coating Schemes for One series of Cutting Tools

| Tool No. (MCT8686)/ PcBN Composition | Coating Scheme | Thickness (micrometers) | Braze Alloy |
| --- | --- | --- | --- |
| 10 KD050 | N/CN/OCN/A/N | 4.0/7.6/2.7 | Nickel-Gold |

TABLE 4

Coating Schemes for a Second Series of Cutting Tools

| Tool No. (MCT 8787)/PcBN Composition | Coating Scheme | Thickness (micrometers) | Braze Alloy |
| --- | --- | --- | --- |
| 8 KD050 | CN/OCN/TiAlOCN/A/N | 3.3/7.0/2.4 | Nickel-Gold |
| 10 KD050 | C/CN/OCN/TiAlOCN/ A/N | 5.2/7.0/4.0 | Nickel-Gold |
| 17 KD050 | C/CN/OCN/TiAlOCN/ A/N | 3.5/4.4/3.4 | Nickel-Gold |
| 19 KD050 | MT-N/ MT/CN/OCN/TiAlOCN/ A/N | 3.4/9.2/2.2 | Nickel-Gold |

TABLE 5

Coating Scheme for a Third Series of Cutting Tools

| Tool No. (MCT9610) PcBN Composition | Coating Scheme | Thickness (micrometers) | Braze Alloy |
| --- | --- | --- | --- |
| 2/KD050 | MT-N/ MT/CN/OCN/TiAlONC/A/N | 5.9/4.0/3.1 | Silver-Palladium |
| 3/KD050 | CN/OCN/TiAlOCN/ A/N/CN/N | 3.8/6.0/2.4 | Silver-Palladium |
| 5/KD050 | MT-N/MT/CN/ OCN/TiAlONC/A/N | 9.4/4.4/3.1 | Copper-Gold |

TABLE 6

Coating Scheme for a Fourth Series of Cutting Tools

| Tool No. (MCT9319) PcBN Composition | Coating Scheme | Thickness (micrometers) | Braze Alloy |
|---|---|---|---|
| 6/KD050 | MT-N/MT/CN/OCN/TiAlOCN/A/N | 2.9/5.0/3.8 | Copper-Gold |
| 14/KD050 | CN/OCN/TiAlOCN/A/N/CN/N | 4.8/10.5/2.5 | Copper-Gold |

TABLE 7

Coating Scheme for a Fifth Series of Cutting Tools

| Tool No. PcBN Composition | Coating Scheme | Thickness (micrometers) | Braze Alloy |
|---|---|---|---|
| 1/KD050 | MT-N/MT/CN/OCN/TiAlOCN/A/N | 3.4/3.8/2.4 | Silver-Palladium |
| 2/KD050 | MT-N/MT/CN/OCN/TiAlOCN/A | 3.5/2.1 | Silver-Palladium |

Another coating scheme comprises the following steps: (1) etching the blank surface with titanium tetrachloride and aluminum chloride gases; (2) applying via CVD a coating of titanium nitride at a temperature of about 900 degrees Centigrade to a thickness that ranges between about 0.5 micrometers and about 3.0 micrometers with a preferred thickness that equals about 1 micrometers; (3) applying via CVD a coating of titanium carbonitride at a temperature of about 880 degrees Centigrade to a thickness that ranges between about 1.5 micrometers and about 10.0 micrometers with a preferred thickness that equals about 4 micrometers; (4) applying via CVD a coating of titanium carbonitride at a temperature of about 1000 degrees Centigrade to a thickness that ranges between about 0.5 micrometers and about 5 micrometers with a preferred thickness that equals about 1 micrometers; (5) applying via CVD a bonding layer of titanium oxycarbonitride at a temperature of about 1000 degrees Centigrade to a thickness that ranges between about 0.1 micrometers and about 4 micrometers with a preferred thickness that equals about 0.3 micrometers; (6) applying via CVD a coating of titanium aluminum oxycarbonitride at a temperature of about 1000 degrees Centigrade to a thickness that ranges between about 0.1 micrometers and about 4.0 micrometers with a preferred thickness that equals about 0.5 micrometers; (7) applying via CVD a coating of alumina at a temperature of about 1000 degrees Centigrade to a thickness that ranges between about 1 micrometer and about 10 micrometers with a preferred thickness that equals about 4.0 micrometers; and (8) applying via CVD a coating of titanium nitride-titanium carbonitride at a temperature of about 1000 degrees Centigrade to a thickness that ranges between about 0.5 micrometers and about 8 micrometers with a preferred thickness that equals about 2 micrometers. The composition of the polycrystalline cubic boron nitride was KD050. The braze alloy that was used was copper-gold or silver-palladium.

Another coating scheme comprises the steps of: (1) applying by CVD (880 degrees Centigrade) a layer of titanium nitride to a thickness that ranges between about 0.5 micrometers and about 3 micrometers with a preferred thickness that equals about 1 micrometers; (2) applying by moderate temperature CVD (880 degrees Centigrade) a layer of titanium carbonitride to a thickness that ranges between about 1 micrometers and about 10 micrometers with a preferred thickness that equals about 2 micrometers; (3) applying by high temperature CVD (1000 degrees Centigrade) a layer of titanium carbonitride to a thickness that ranges between about 0.5 micrometers and about 6 micrometers with a preferred thickness that equals about 1 micrometers; (4) applying via CVD a bonding layer of titanium oxycarbonitride at a temperature of about 1000 degrees Centigrade to a thickness that ranges between about 0.1 micrometers and about 4.0 micrometers with a preferred thickness that equals about 0.3 micrometers; (5) applying via CVD a bonding layer of titanium aluminum oxycarbonitride at a temperature of about 1000 degrees Centigrade to a thickness that ranges between about 0.1 micrometers and about 4.0 micrometers with a preferred thickness that equals about 0.5 micrometers; and (6) applying by CVD (990 degrees Centigrade) a layer of alumina to a thickness that ranges between about 1 micrometers and about 10 micrometers with a preferred thickness that equals about 2 micrometers. The composition of the polycrystalline cubic boron nitride was KD050. The braze alloy that was used was silver-palladium.

Applicants further contemplate the use of a coating scheme that contains at least one layer comprising a nitride, carbide, carbonitride, oxynitride, oxycarbonitride, or oxycarbide of one or more of titanium, vanadium, chromium, zirconium, niobium, molybdenum, hafnium, tantalum, tungsten, aluminum, and silicon. This coating scheme includes as a possible layer a layer of titanium aluminum nitride applied by physical vapor deposition.

In testing applicants have found that the coated cutting tools that use the high temperature braze alloys, especially when coupled with the coating schemes containing layers of MT-TiN/MT-TiCN/HT-TiCN/TiOCN/TiAlOCN/Al$_2$O$_3$ and, MT-TN/MT-TiCN/HT-TiCN/TiOCN/TiAlOCN/Al$_2$O$_3$/HT-TiCN/HT-TiN, have shown excellent performance results. Along this line, applicants have found that the results are very good in the hard turning of hard steels such as D3 tool steel.

Applicants have also found that the coated cutting tools that have coatings such as, for example, titanium aluminum nitride or alumina, use the design and geometry of the superhard blanks disclosed herein, regardless of the braze alloy used to braze the superhard blank to the cutting tool body, also have experienced improved performance. It appears that the design and geometry of the superhard blank have resulted in the reduction of the exposure of the braze joint to the temperatures generated at the point of contact between the cutting tool and the workpiece material.

One specific method of threading that has provided excellent results when using these cutting tools (i.e., threading tools) is a constant volume threading method. In this method, the depth of the pass is constantly decreased so that the volume of material removed from the workpiece is constant for each pass. To achieve this constant volume one takes the infeed per pass formula: accumulated depth=initial depth of cut (doc)·(No. pass)$^{1/2}$ to arrive at the depth of cut for each pass. The Table 8 below sets forth an example of this method showing the first four passes. Additional passes determined per the calculation are necessary to obtain an external thread depth of 0.0789 inches.

TABLE 8

Sample Calculations for a Constant Volume Threading Method
[8 pitch external thread has a depth of .0789 inches]

| Pass No. | First Calculation | Second Calculation | Infeed depth of cut for the pass |
|---|---|---|---|
| 1 | 25% of .0798 = .0197 | NA | .0197 |
| 2 | $.0197 \cdot 2^{1/2} = .0278$ | .0278 − .0197 = .0082 | .0082 |
| 3 | $.0197 \cdot 3^{1/2} = .0341$ | .0341 − .0278 = .0063 | .0063 |
| 4 | $0197 \cdot 4^{1/2} = .0394$ | .0394 − .0341 = .0053 | .0053 |

The constant volume threading method can be described as a method of removing material in a threading operation from a workpiece comprising a ferrous alloy having a hardness between about 50 Rockwell C and about 65 Rockwell C using a coated cutting tool. The method has the following steps: providing a coated cutting tool having body containing a pocket where a superhard blank is brazed using a braze alloy into the pocket to form a braze joint wherein the braze alloy having a liquidus temperature of at least about 900 degrees Centigrade wherein the braze alloy is selected from the group comprising a nickel-gold braze alloy containing nickel and gold, a copper-gold braze alloy containing copper and gold, a gold-copper-nickel braze alloy contains gold and copper and nickel, a silver-titanium-copper braze alloy containing silver and titanium and copper, and a silver-palladium braze alloy containing silver and palladium; and engaging the workpiece with the coated cutting tool on multiple passes wherein each pass removes a volume of material that is substantially equal to the volume of material removed from the workpiece in the previous pass.

While the constant volume threading method is the preferred method of threading, applicants contemplate that one or more threading passes may remove either a lower volume of material than calculated per the formula or a lower volume of material than removed in the previous pass. Thus, such a method includes the step of engaging the workpiece with the coated cutting tool on multiple passes wherein each pass removes a volume of material substantially equal to or less than the volume of material removed from the workpiece in the previous pass.

Applicants note that there is a United States Patent Application by the same inventors filed on the same day as this patent application and entitled UNCOATED CUTTING TOOL USING BRAZED-IN SUPERHARD BLANK.

All patents, patent applications, articles and other documents identified herein are hereby incorporated by reference herein. Other embodiments of the invention may be apparent to those skilled in the art from a consideration of the specification or the practice of the invention disclosed herein. It is intended that the specification and any examples set forth herein be considered as illustrative only, with the true spirit and scope of the invention being indicated by the following claims.

What is claimed is:

1. A coated cutting tool comprising:
a body, the body containing a pocket;
an uncoated polycrystalline cubic boron nitride blank wherein the polycrystalline cubic boron nitride blank comprises about 90 volume percent cubic boron nitride and about 10 volume percent of aluminum nitride and titanium diboride and silicon carbide; the uncoated blank being brazed into the pocket using a braze alloy whereby there is a braze joint between the uncoated blank and the body;
the braze alloy having a liquidus temperature of at least about 900 degrees Centigrade; and
a coating applied to the uncoated blank brazed into the pocket.

2. The coated cutting tool of claim 1 wherein the coating is applied by physical vapor deposition.

3. The coated cutting tool of claim 1 wherein the coating is applied by a combination of physical vapor deposition and chemical vapor deposition.

4. The coated cutting tool of claim 1 wherein the coating is applied by chemical vapor deposition.

5. The coated cutting tool of claim 1 wherein the braze alloy comprises gold and copper, and the gold being present in an amount ranging between about 30 weight percent and about 60 weight percent, and the copper being present in an amount ranging between about 40 weight percent and about 70 weight percent.

6. The coated cutting tool of claim 5 wherein the braze alloy further includes nickel, and the nickel being present in an amount between about 2 weight percent and about 7 weight percent.

7. The coated cutting tool of claim 6 wherein the braze alloy comprises between about 35 weight percent to about 40 weight percent gold, between about 60 weight percent and about 65 weight percent copper, and between about 1 weight percent and about 5 weight percent nickel.

8. The coated cutting tool of claim 5 wherein the braze alloy comprises between about 30 weight percent and about 40 weight percent gold and between about 60 weight percent and about 70 weight percent copper.

9. The coated cutting tool of claim 5 wherein the braze alloy comprises between about 50 weight percent gold and about 50 weight percent copper.

10. The coated cutting tool of claim 5 wherein the braze alloy comprises between about 37.5 weight percent gold and about 62.5 weight percent copper.

11. The coated cutting tool of claim 1 wherein the braze alloy comprises gold and nickel, and the gold being present in an amount ranging between about 65 weight percent and about 90 weight percent, and, being present in an amount ranging between about 15 weight percent and about 25 weight percent.

12. The coated cutting tool of claim 11 wherein the braze alloy further includes palladium, and the palladium being present in an amount between about 5 weight percent and about 15 weight percent.

13. The coated cutting tool of claim 12 wherein the braze alloy comprises between about 65 weight percent to about 75 weight percent gold, between about 20 weight percent and about 25 weight percent nickel, and between about 5 weight percent and about 10 weight percent palladium.

14. The coated cutting tool of claim 13 wherein the braze comprises about 70 weight percent gold, about 22 weight percent nickel, and about 8 weight percent palladium.

15. The coated cutting tool of claim 11 wherein the braze alloy comprises between about 80 weight percent and about 85 weight percent gold and between about 15 weight percent and about 20 weight percent nickel.

16. The coated cutting tool of claim 1 wherein the braze alloy comprises between about 90 weight percent and about 98 weight percent silver and about 2 weight percent and about 10 weight percent palladium.

17. The coated cutting tool of claim 16 wherein the braze alloy comprises between about 93 weight percent and about 97 weight percent silver and about 3 weight percent and about 7 weight percent palladium.

18. The coated cutting tool of claim 1 wherein the liquidus temperature of the braze alloy is at least about 1000 degrees Centigrade.

19. The coated cutting tool of claim 1 wherein the liquidus temperature of the braze alloy is at least about 940 degrees Centigrade.

20. The coated cutting tool of claim 1 wherein the coating includes at least one layer of alumina applied by chemical vapor deposition at a temperature less than the liquidus temperature of the braze alloy.

21. The coated cutting tool of claim 20 wherein the coating scheme further includes a layer of titanium oxycarbonitride applied by chemical vapor deposition at a temperature less than the liquidus temperature of the braze alloy.

22. The coated cutting tool of claim 20 wherein the coating scheme further includes a layer of titanium aluminum oxycarbonitride applied by chemical vapor deposition at a temperature less than the liquidus temperature of the braze alloy.

23. The coated cutting tool of claim 20 wherein the coating scheme further includes at least one layer of titanium carbonitride applied by chemical vapor deposition at a temperature less than the liquidus temperature of the braze alloy.

24. The coated cutting tool of claim 20 wherein the coating scheme further includes at least one layer of titanium nitride applied by chemical vapor deposition at a temperature less than the liquidus temperature of the braze alloy.

25. The coated cutting tool of claim 1 wherein the coating includes at least one layer of titanium aluminum nitride applied by physical vapor deposition.

26. The coated cutting tool of claim 1 wherein the polycrystalline cubic boron nitride blank comprises a layer of polycrystalline cubic boron nitride comprising about 50 volume percent cubic boron nitride and about 50 volume percent titanium carbide.

27. The coated cutting tool of claim 26 wherein the polycrystalline cubic boron nitride blank further includes a support an which the layer of polycrystalline cubic boron nitride is applied.

28. The coated cutting tool of claim 1 wherein the coating contains at least one layer comprising a nitride, carbide, carbonitride, oxynitride, oxycarbonitride, or oxycarbide of one or more of titanium, vanadium, chromium, zirconium, niobium, molybdenum, hafnium, tantalum, tungsten, aluminum, and silicon.

29. A coated cutting tool comprising:
a body, the body containing a pocket;
an uncoated superhard blank wherein the superhard blank comprises about 90 volume percent cubic boron nitride and about 10 volume percent of aluminum nitride and titanium diboride and silicon carbide; the uncoated blank being brazed into the pocket using a braze alloy whereby there is a braze joint between the uncoated blank and the body;
the braze alloy having a liquidus temperature of at least about 900 degrees Centigrade wherein the braze alloy is selected from the group comprising a nickel-gold braze alloy containing nickel and gold, a copper-gold braze alloy containing copper and gold, and a silver-palladium braze alloy containing silver and palladium; and
a coating applied to the uncoated blank brazed into the pocket.

30. The coated cutting tool of claim 29 wherein the coating contains at least one layer comprising a nitride, carbide, carbonitride, oxynitride, oxycarbonitride, or oxycarbide of one or more of titanium, vanadium, chromium, zirconium, niobium, molybdenum, hafnium, tantalum, tungsten, aluminum, and silicon.

31. The coated cutting tool of claim 29 wherein the coating scheme further includes a layer of titanium oxycarbonitride applied by chemical vapor deposition at a temperature less than the liquidus temperature of the braze alloy.

32. The coated cutting tool of claim 29 wherein the coating scheme further includes a layer of titanium aluminum oxycarbonitride applied by chemical vapor deposition at a temperature less than the liquidus temperature of the braze alloy.

33. The coated cutting tool of claim 29 wherein the coating scheme further includes at least a layer of titanium carbonitride applied by chemical vapor deposition at a temperature less than the liquidus temperature of the braze alloy.

34. The coated cutting tool of claim 29 wherein the coating is applied by physical vapor deposition.

35. The coated cutting tool of claim 29 wherein the coating is applied by a combination of physical vapor deposition and chemical vapor deposition.

36. The coated cutting tool of claim 29 wherein the coating is applied by chemical vapor deposition.

37. The coated cutting tool of claim 29 wherein the coating includes at least one layer of titanium nitride applied by chemical vapor deposition at a temperature less than the liquidus temperature of the braze alloy.

38. The coated cutting tool of claim 29 wherein the coating includes at least one layer of titanium aluminium nitride applied by physical vapor deposition.

* * * * *